US012613899B2

(12) United States Patent
Salesky et al.

(10) Patent No.:  US 12,613,899 B2
(45) Date of Patent:      Apr. 28, 2026

(54) DOCUMENT CORRELATION OPTIMIZER

(71) Applicant: Broadsword Ventures LLC, Lorton, VA (US)

(72) Inventors: Mark Edwin Salesky, Lorton, VA (US); PJ Salesky, Lorton, VA (US)

(73) Assignee: Broadsword Ventures LLC, Lorton, VA (US)

( * ) Notice: Subject to any disclaimer, the term of this patent is extended or adjusted under 35 U.S.C. 154(b) by 0 days.

(21) Appl. No.: 18/622,397

(22) Filed: Mar. 29, 2024

(65) Prior Publication Data

US 2025/0307297 A1      Oct. 2, 2025

(51) Int. Cl.
| | |
|---|---|
| *G06F 16/33* | (2025.01) |
| *G06F 16/334* | (2025.01) |
| *G06F 16/34* | (2025.01) |

(52) U.S. Cl.
CPC .......... *G06F 16/345* (2019.01); *G06F 16/334* (2019.01)

(58) Field of Classification Search
CPC .............................. G06F 16/345; G06F 16/334
See application file for complete search history.

(56) References Cited

U.S. PATENT DOCUMENTS

| | | | | |
|---|---|---|---|---|
| 8,166,032 B2 * | 4/2012 | Sommer | .............. | G06F 16/355 |
| | | | | 707/758 |
| 8,473,279 B2 * | 6/2013 | Al-Shammari | ....... | G06F 40/268 |
| | | | | 704/8 |
| 11,222,167 B2 * | 1/2022 | Gehrmann | ............ | G06F 3/0482 |
| 11,301,639 B2 * | 4/2022 | Jalali | .................... | G06F 40/166 |
| 11,593,439 B1 * | 2/2023 | Avadhani | ............. | G06F 16/313 |
| 2023/0405449 A1 * | 12/2023 | Carroll | .................. | A63F 3/0421 |
| 2024/0193192 A1 * | 6/2024 | Reilly, IV | .......... | G06F 16/3344 |

* cited by examiner

*Primary Examiner* — Debbie M Le
(74) *Attorney, Agent, or Firm* — Kinney & Lange, P.A.

(57)                  ABSTRACT
A method for calculating the correlation of the complete textual contents of one document to another one or many documents, to assess, compare and improve the responsiveness of one document to another, of which many possible uses are contemplated. This method comprises deconstruction of each word within said documents into its root form and the application of statistical metrics, then generating various visual presentations of that correlation and associated data. Further, the method is implemented in a system of software code and algorithms. The method and system have great utility for the User in determining the degree of responsiveness of one document to the other; one embodiment being to improve the responsiveness of a business proposal to a business solicitation. Many other embodiments may be contemplated across many disciplines which use digital text documents for analysis, comparison, evaluation, and decision making.

12 Claims, 7 Drawing Sheets

DIAGRAM FOR THE PROCESS STEPS WHICH COMPRISE THE INVENTION

Overall diagram of the Invention

DIAGRAM FOR THE PROCESS STEPS WHICH COMPRISE THE INVENTION

Overall diagram of the Invention

**Process Step 1: Deconstruction to Root Form of the Document Contents,
perform in software by Components of our Invention WD-1, WD-2, VC-1, KW-1, and KW-2**

Process Step 2:  Correlation of the Documents, perform in software by Component of our Invention  TC-1

Rooted Data table for Document A

| New data Entry | Frequency |
|---|---|
| project | 2 |
| prompt | 1 |
| robust | 1 |
| project | 1 |
| efficiency | 1 |

Correlation

Rooted Data table for Document B

| New data Entry | Frequency |
|---|---|
| project | 4 |
| cost | 2 |
| robust | 1 |
| project | 1 |
| efficiency | 1 |

Process Step 2: Correlation of the Documents, perform in software by Component of our Invention TC-1

Document A

| Formatting characters | Frequency |
|---|---|
| Pages | 8 |
| Paragraphs | 109 |
| Spaces | 2163 |

Cosine Similarity

Document B

| Formatting characters | Frequency |
|---|---|
| Pages | 17 |
| Paragraphs | 454 |
| Spaces | 6565 |

Process Step 3:  Visualization of the Correlation, perform in software by Component of our Invention  GG-1

Tabular format:

FIG. 4A

Graphical format:

Word Cloud format:

FIG. 4C

DOCUMENT CORRELATION OPTIMIZER

CROSS-REFERENCE TO RELATED APPLICATIONS

A Provisional Patent Application was submitted with receipt confirmation by USPTO on Apr. 16, 2023 at 5:00 PM ET, under the Title "Document Correlation Optimizer", Application No. 63/496,308.

BACKGROUND OF THE INVENTION

Field of the Invention

This invention is related to information analysis, and more particularly, to the ability to objectively assess how well one document correlates to another, the results of this correlation to help the author achieve a goal of responsiveness. This method and system bridge the divide between manual and automated analysis as applied to whole documents, to inform the user of the meaningfulness of the correlation. These terms are further described below in the "Summary of the Invention" section.

Description of Related Art

Information technology has been used extensively for the purpose of composing, editing, searching for, and retrieving written documents represented in digital format. But there are limitations. Because the totality of a written document is unique in composition, meaning, and other nuances that emerge from the creative efforts of the author(s), information technology has focused mostly on atomic operations; that is, algorithms and processing applied to smallest element of written text, such as individual characters (i.e., "use a period, not a comma") or individual words (i.e., spell checking). In short, written documents are inherently qualitative and unique, like how a fingerprint is common to all persons and at the same time unique to each person.

In contrast, numerical data is much more easily processed in digital format, and there is enormous proliferation of analytical techniques using mathematical calculations (e.g., spreadsheets and algorithms). Search engines and related internet-based algorithms are generally applied to linking one search term or phrase with another, presenting the User with a logical connection to another document, but leaving the User to determine whether the document is thematically well-matched to the inquiry. In other words, the computer identifies the possible related documents, but the reader must actually read and then assess the relevance using his own judgment and intuition. This is why a Google search can return thousands, even millions of possible matches.

Our invention is not a search utility at all because search applications which use a form of correlation depend upon the description of the document as presented in the title, metadata, or key phrases. In clear contrast, our invention processes the entire content of the documents of concern, and produces useful metrics to quantitatively show if the author is really "answering the questions posed." This becomes very clear in the scenario that motivated this invention: the preparation and submission of competitive business proposals. In this scenario, it is common for the seller of goods or services ("seller") to prepare a proposal at arms-length from the buyer, sometimes at great expense, only to be technically compliant in format, general content, timeliness, and all other instructions, but not responsive to the buyer. In this case, responsiveness is both an objective and subjective criteria that is extremely elusive since it addresses the proposal document as a whole. With some written proposals consisting of dozens, even hundreds of pages, the degree of "responsiveness" to the needs, desires, and preferences of the buyer, is usually a human judgment, sometimes made by committee, and always subject to bias, omission, and unrealistic optimism. Our invention bridges that bias with quantitative information that is consistent, repeatable, and objective.

Another example of current related art that does not bridge the qualitative/quantitative gap in document processing is something close to home—the patent search. The USPTO patent search makes use of Boolean logic ("and/or" queries applied across multiple metadata criteria (e.g., author, title). This is the classical and proven search methodology used in infinite ways in Information Technology applications. It yields a list of patents which are related . . . but are they responsive to the inquirer's search? The inquirer must still read the application to determine that.

These two scenarios in the preceding paragraphs describe in general terms the limitations of much of the information technology application in current art.

It is also important to recognize that many software apps perform a "correlation," which is not defining of any specific process, method or technique, but rather, indicates a relationship or connection. In fact, there are many correlation techniques, including common methods such as Scatter Diagram Method; Karl Pearson's Coefficient of Correlation; Spearman's Rank Correlation Coefficient; and Methods of Least Squares. The term "correlation" in any context is only generic until applied in specific formula, algorithm, and technique. In many applications different than ours, the intent of the method or software is to "find" another document based on an algorithmic correlation, typically ranking them in a rough order of relationship. Underlying all these approaches is the concept of keywords, which are weighted in importance than all other words, and thereby establish a ranking which may (or may not) be satisfactory to the user. The usage of ranking keywords is a computationally efficient process, but rarely yields results that are exactly to the user's intent. This is fundamentally the reason for using the Internet, everyone has the experience of doing multiple searches and scrolling through many possibilities before finding a satisfactory response. Our invention does not make use of this keyword correlation technique.

SUMMARY OF THE INVENTION

This invention is a new and novel process and system which provides a user with mathematically derived correlation score based on the thematic content of two or more written documents of interest. The method decomposes the document into individual words or phrases, deconstructs or reduces them into their root form, organizes the deconstructed words into a data structure which enables mathematical calculations, then presents the results in one or more visual formats wherein the overall correlation, referred to as the Thematic Correlation Score (TC Score), indicates both the relative degree of responsiveness and also a guide to improve that responsiveness in successive versions of the document(s).

This method implements several concepts and terms as generally defined here. Specific implementation may vary with the application and implementation as a system. All of these are stated in the context of written documents in digital format. The use of the term "party" can mean a single person, team, collective body, business or corporate entity, wherein:

"Responsiveness" means the degree of satisfying the intent or request by one party, by the written reply of a second party, with a mutually agreeable outcome. Responsiveness is agnostic to the form or common name of the reply, e.g. it could be a "proposal" in the context of business, a "plea" or "argument" in the context of legal.

"Meaningfulness of the correlation" means the degree to which a User can judge how one or more documents are mathematically similar to another document or documents in order to satisfy the interests and intent of the User.

"Correlation" means the connection or relationship between two or more documents as measured in a mathematical way (often using statistical methods), which can be applied to or expressed in many ways, such as appearance, format, and perceived quality.

"Thematic content" means the totality of words in context of their root meaning, regardless of syntax or grammar. Thematic correlation is distinguished from other meanings of correlation by the deconstruction of any word to and comparative analysis of its grammatical root format. For example, the word "robustness" is deconstructed to "robust", and "employees" is deconstructed to "employee."

"Thematic Correlation Score (TC Score)" is the term our invention uses to quantify the results of our Processes as a numerical value.

Our invention also comprises a system of computer code which implements this method, with various utilities and functions which are common computer applications, but uniquely comprises the presentation of one or more visual representations of the thematic correlation as illustrated in the drawings.

Our system which implements our method comprises computer code in specific parts, which carry out the claimed steps, as shown in the drawings. The only required inputs to the system are two or more written documents which can be read by a computer program as individual characters: typical digital formats are .txt, .doc, .docx, and .pdf. All processing steps conducted by the system are relative to the documents.

Our invention differs from other document correlation methods and systems because it does not rely upon a keyword or phrase indexing, which is core the vast majority of the document search-and-retrieve systems operating on the Internet, public, or private networks.

Our invention further differs from other document correlation methods and systems because it uses a method to deconstruct the entire document content to achieve a basis of correlation between two or more documents, whereas other systems perform matches based on the title, summary, abstract or metadata which merely describes the content of the document. This feature is illustrated in drawing 2 titled "Invention Process 1—Deconstruction to Root Form of the Document Contents."

Our invention further differs from other document correlation methods and systems because it measures correlation relative to the entire deconstructed contents of the documents (referred to as the TC Score) without reference to any external baseline or template, whereas other systems make use of ranking orders, weighting, or other externally set parameters that determines the rank order of matching. This feature is illustrated in FIGS. 3A and 3B.

Our invention further differs from other methods and systems by applying the TC Score to various visual presentations within the application, thereby providing contextual information like but not limited to magnitude, statistical frequency, pattern matching, and prioritization of the poor correlations. This feature is illustrated in FIG. 4.

Our invention further differs from other documentation analysis methods and systems because it produces metrics which are visually presented to the user in a graphical or tabular format, which allows the user to judge the Meaningfulness of the Correlation.

Our invention further differs from other documentation analysis methods and systems because it records the significant calculations of each iteration, enabling the User to make improvements in the prose, logic, and emphasis of important thematic elements, which are fundamental to the User's objectives of Responsiveness. Whereas other systems merely present data for user interpretation.

Our invention further differs from other methods and systems by the utility of presenting visual representations as described in the preceding paragraph, which enable and guide the user to make active changes and improvements in subsequent rewrites/versions of the document.

The features and advantages described in this summary and the following detailed description are not all-inclusive. Many additional features and advantages will be apparent to one of ordinary skill in the art, in view of the drawings, specification, and claims.

BRIEF DESCRIPTION OF DRAWINGS

FIG. 4A illustrates a table that provides a visualization of data and a numerical thematic content score.

FIG. 4C illustrates a word cloud that provides a visualization of data relevant to correlation operations between written documents.

DETAILED DESCRIPTION OF THE INVENTION

Figure 1:
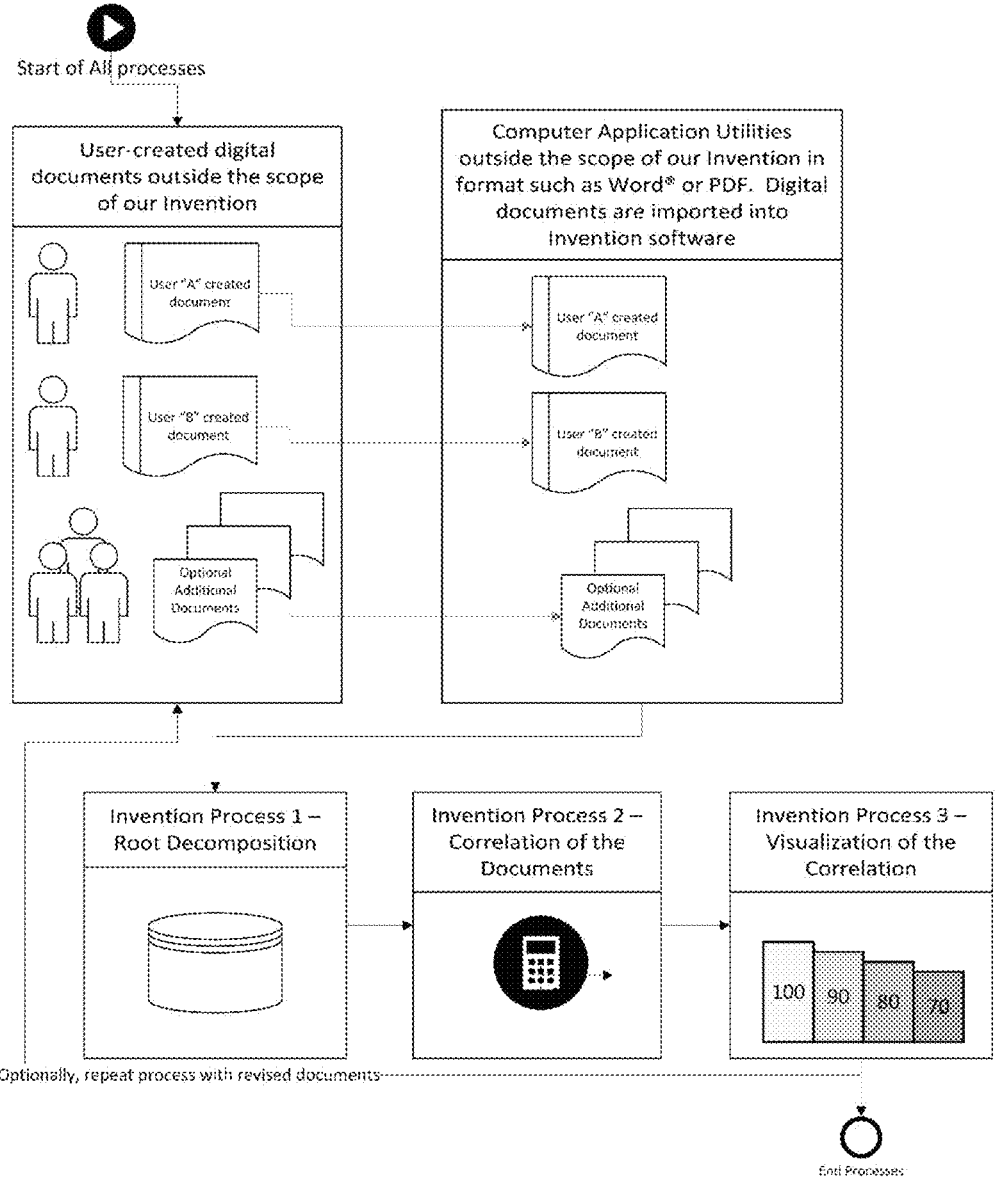
FIG. 1 is a flow diagram illustrating example operations for determining and visualizing a correlation between documents.

Our invention comprises 7 separate software components which perform the steps of our method and actualize the method in our software system. While listed in series on the table that follows, within the computer one or more of these steps are performed concurrently, making use of the nature of software parallel operations. These 7 components are described as follows and further illustrated in the figures.

TABLE 1

| Component Reference ID | Component Name | Process Description |
|---|---|---|
| | | List of Process Components of our Invention as a Method |
| WD-1 | Word deconstruction | This is the process of dividing the uploaded document into individual words and special characters and storing this information in the database, inclusive of but not limited to the following word conversions: 1) plural to single, 2) remove "-ly", 3) remove "-ness", remove special characters and numbers, and 4) remove "-ing". |
| WD-2 | Word tabulating | This process creates a frequency model of the deconstructed words for any one document as a preliminary step to correlation analysis. It writes the results into the application database. |
| VC-1 | Version Control | Each version of the non-reference document (i.e., the proposal, reply, offer, etc.) is recorded in the application database alone with the specific metrics and calculations that apply uniquely to that version. The system displays each version in the User Interface, and allows for the analysis visual presentations to be reconstructed on demand. |
| KW-1 | Processing of Known Word List (KWL) | This process performs a database operation that deletes or exempts from the document word frequency table all the words that are contained in the KWL. This reduces the number of entries in the frequency table, removing all words and phrases which are common and thematically irrelevant. The KWL is an evolving set of words, phrases, or characters, which is updated periodically and incorporated into the software version release. |
| KW-2 | Processing of Registered Word List | This process performs a database operation that deletes or exempts from the document word frequency table all the words (in deconstructed form) that are contained in the RWL. The RWL is a set of words, phrases, or characters which is inputted by the User of the software via a screen form, and makes it unique to the specific case (i.e., the proposal, reply, offer, etc.). |
| TC-1 | Thematic Correlation | This process performs the calculation of a Thematic Correlation Score (TC Score), using one or several mathematical techniques to uniquely characterize the document under analysis. One implementation makes use of a signal processing technique known as the Pearson Correlation Coefficient (PCC). [] Another implementation makes use of another technique known as Modified Cosine Similarity (MSC). []The application of these techniques alone, together, or in combination with other mathematical variations, which are known to one skilled in math and statistics, are used to compare the unique digital "fingerprints" of each document in the form of data arrays, comprised of both the words and structure of the imported documents. That statistical comparison of the entirety of the document thereby answers the question "how responsive is one document to the other?" which is a valuable insight for a variety of scenarios as suggested by our Embodiments.[][] |
| GG-1 | Generating visual presentations of the Thematic Correlation Score (TC Score). | This process generates the visual presentations of the meaningfulness of correlation (described earlier), which shows the digital "fingerprint" of the versioned document in comparison the reference document, along with the mathematical calculations that support those presentations, including but not limited to the TC Score. Other calculations may be statistical expressions (e.g., mean, average, percent), second-order metrics (e.g., percent improvements), or text reference data (page location of certain thematic words). The visual presentations include identifying data to support version control. All of these visual presentations assist the User in determining the Responsiveness, which in turn allows iterative improvements to achieve a mutually agreeable outcome between the parties. |

Additional components are common industry elements incorporated into the system so that it is compatible with the current and future state of computing technology. These additional components also perform specific processes which may be implemented in by various software technologies, and will evolve over time. They are analogous to a framework or rigging, within which our invented compo- nents operate interactively. The specific software which implements these components may vary over time, and work with our invented components as an integrated system. This set of components are not the subject of our Invention, but are provided here to illustrate the nature of complex modern software comprised of many individual components work- ing together.

TABLE 2

| a list of common software utilities which combined with our Invention implements our methods as a Software System. | | |
|---|---|---|
| Component | Component Name | Process Description |
| IN | Installation | This process installs the app from a downloaded file. It produces an executable file which, when opened, prompts various processes (licensing, etc.). |
| LA | License activation | License activation is by a password or similar access control. |
| DB | Included DB | This is the creation and operation of a database that serves to record all ingested and generated data for the application. |
| IG | Ingestion of text documents | This process allows the User to upload a file from the host platform, either .doc, .docx, .pdf, or .txt. |
| MS | On screen messages | Information provided to the User about the processes and buttons on the screen |
| TR | Training | User guides/manuals and training videos which are common to the industry are part of the overall system. |
| RP | Report Generation | This process creates a formatted report with the data elements cited in GG-I, above, and enables paper printing. |

Figure 2:
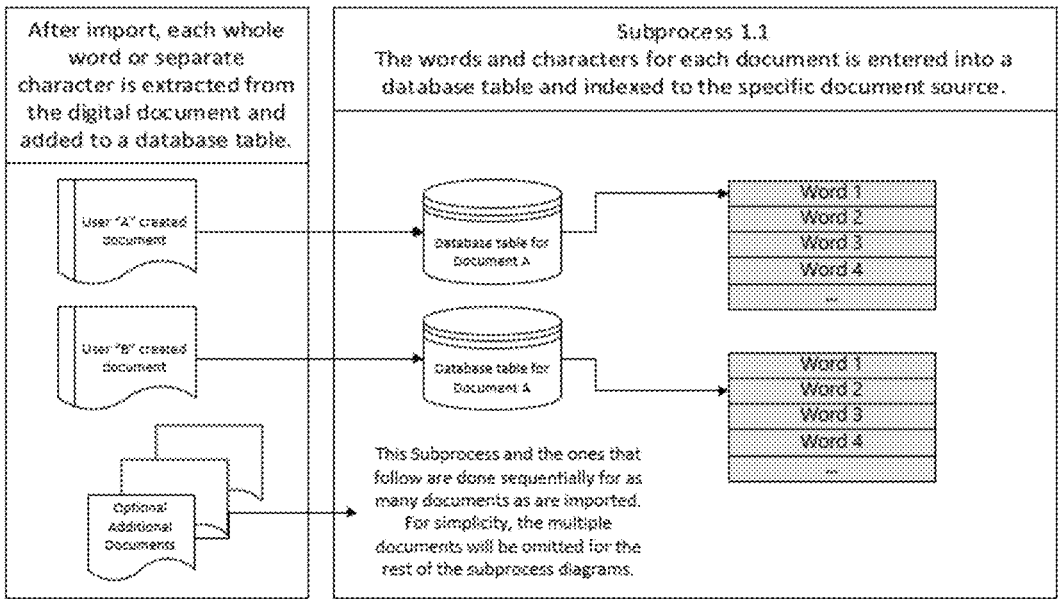
FIG. 2 is a flow diagram illustrating example operations for deconstructing words in documents to root form.

With respect to FIG. 2, which illustrates example operations for deconstructing words in documents to root form, the following tables illustrate how Subprocesses 1.1 to 1.9 are applied to examples of words from each table. The process of deconstruction to root word format comprises important elements of our invention, which is done with various software algorithms.

Subprocess 1.1: Remove Numbers and Special Characters

| Database table | | |
|---|---|---|
| Example Data item | Operation | New data Entry |
| → % | Delete Num, Spcl Char. | null |
| → 14 | Delete Num, Spcl Char. | null |
| And | | and |
| projects | | project |
| promptly | | promptly |
| robustness | | robustness |
| project | | project |
| funding | | funding |

Null entries are then deleted from data table. Process Step 1.3 is then performed.

Process Step 1.2: Transform Nouns to Root Form

| Database table | | |
|---|---|---|
| Example Data item | Operation | New data Entry |
| and | | and |
| project | | projects |
| promptly | | promptly |
| → robustness | Transform nouns | robust |
| project | | project |
| funding | | funding |

Process Step 1.3: Transform Adverbs to Root Form

| Database table | | |
|---|---|---|
| Example Data item | Operation | New data Entry |
| and | | and |
| projects | | projects |

-continued

| Database table | | |
|---|---|---|
| Example Data item | Operation | New data Entry |
| → promptly | Transform adverbs | prompt |
| robust | | robust |
| project | | project |
| funding | | funding |

Process Step 1.4: Transform Plural to Singular Root Form

| Database table | | |
|---|---|---|
| Example Data item | Operation | New data Entry |
| and | | and |
| → projects | Transform to singular | project |
| prompt | | prompt |
| robust | | robust |
| project | | project |
| funding | | funding |

Process Step 1.5: Transform Participles to Root Form

| Database table | | |
|---|---|---|
| Example Data item | Operation | New data Entry |
| and | | and |
| project | | project |
| prompt | | prompt |
| robust | | robust |
| project | | project |
| → funding | Transform participles | fund |

Process Step 1.6: Remove "Known Words". Using a separate table of pre-designated words like "and", "we", "however" and other conventions of written grammar, these words are removed from the tables, leaving words that convey significant meaning of the overall document.

| Database table | | |
|---|---|---|
| Example Data item | Operation | New data Entry |
| → and | Remove Known Words | null |
| project | | project |
| prompt | | prompt |
| robust | | robust |
| project | | project |
| fund | | fund |

Null entries are then deleted from data table. Process Step 1.3 is then performed.

Process Step 1.7: Add "Key Words". Using another separate table of user-designated words which convey significant meaning of the overall document, additional words are added.

| Database table | | |
|---|---|---|
| Example Data item | Operation | New data Entry |
| project | | project |
| prompt | | prompt |
| robust | | robust |
| project | | project |
| fund | | fund |
| | Add Key Words | → efficiency |

Null entries are then deleted from data table. Process Step 1.3 is then performed.

Process Step 1.8: Frequency count added. It is common to find multiple instances of any given root in the document table.

| Example Data item | Operation | Frequency |
|---|---|---|
| project | Count frequency | 2 |
| prompt | Count frequency | 1 |
| robust | Count frequency | 1 |
| project | Count frequency | |
| fund | Count frequency | 1 |
| efficiency | Count frequency | 1 |

Process Step 1.9 Characterize the document by structure. Each document uses formatting conventions of spacing, tabbing, paragraphing, and pagination, which taken together constitute a unique structure or "fingerprint" of the document. This step records the digital characters which indicate these conventions for later processing in Step 2.

| Formatting characters | Frequency |
|---|---|
| Pages | 8 |
| Paragraphs | 109 |
| Spaces | 2163 |

The end result of Process Step 1 is a table for each digital document that contains rooted words of the entire document plus a characterization of the organization of the document. This prepares the data for the Process Step 2.

Continue to Process Step 2.

Figure 3A:
FIG. 3A illustrates data tables that can be used for correlation operations.

FIG. 3A illustrates data tables that can be used for correlation operations. In particular, FIG. 3A illustrates a rooted data table for Document A and a rooted data table for Document B. With 2 or more documents now digitally represented in a table containing root-form words, at least two subprocesses comprise the Correlation Step. Subprocess 2.1: Perform Pearson Correlation Coefficient on two or more data tables, representing the thematic content of each of the documents. This operation results in a numerical value.

Figure 3B:
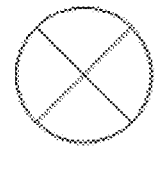
FIG. 3B illustrates data tables that can be used for correlation operations.

FIG. 3B illustrates data tables that can be used for correlation operations. In particular, FIG. 3B illustrates tables representative of the structures of Document A and Document B.

Subprocess 2.2: Perform Modified Cosine Similarity on two or more data tables, representing the structure of each of the documents. This process results in a numerical value. Multiplying the Correlation value by the Cosine Similarity value results in a value we use as the Thematic Correlation Score. Individuals practiced in the science of mathematics might implement variations of these techniques of comparison, which would all be consistent with the Process Steps of our Invention. The end result of Process Step 2 is a numerical value which provide the User with valuable information about the Responsiveness of one document for business purposes, in an objective and repeatable way. Process Steps 1 and 2 prepare the resultant data for Process Step 3. Continue to Process Step 3.

Figure 4A:
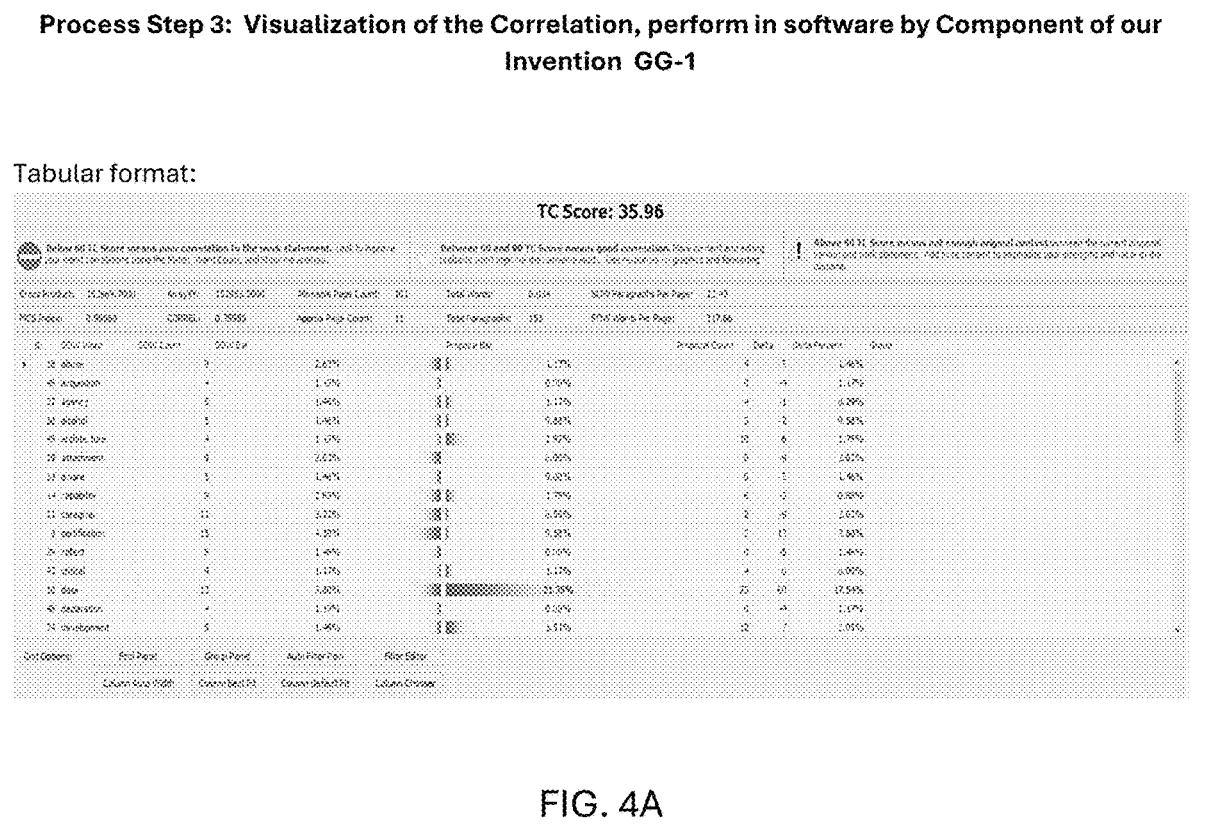
Figure 4B:
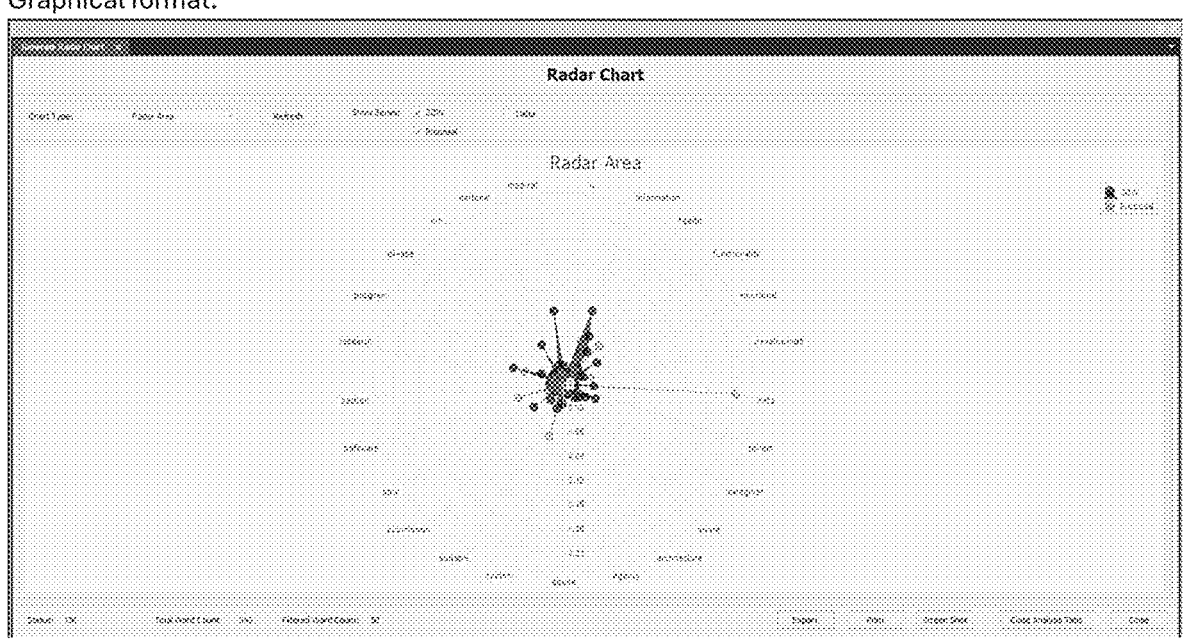
FIG. 4B illustrates a radar chart that provides a visualization of data relevant to correlation operations between written documents.
Figure 4C:
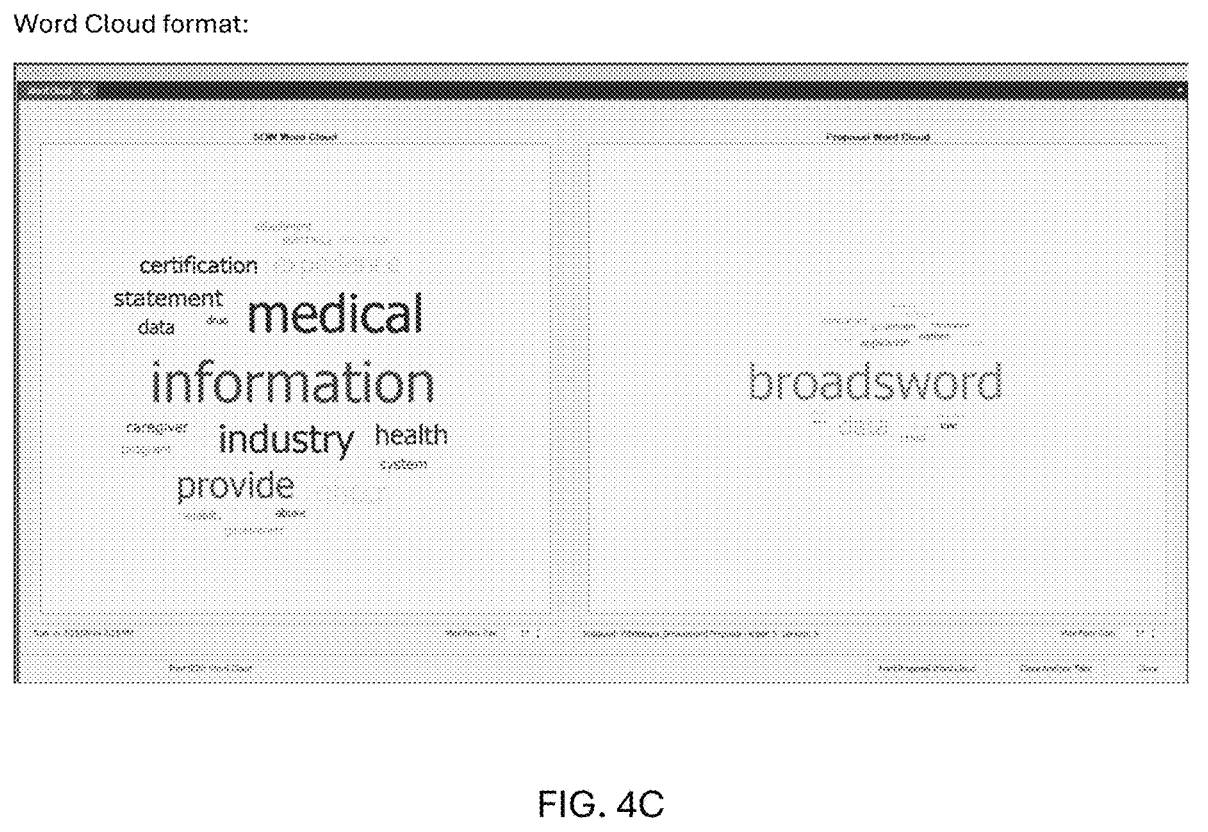

FIGS. 4A-4C illustrate examples of visualizations of data relevant to correlation operations between written documents. FIG. 4A illustrates a table that provides a visualization of data and a numerical thematic content score. FIG. 4B illustrates a radar chart visualization of the data. FIG. 4C illustrates a word cloud visualization of the data.

With the two or more documents "fingerprinted" by Decomposition to Root (Process 1) and Correlated (Process 2), this data resides within the computer. Process Step 3 conveys the data to the User(s) as information in one or more visualizations displayed on the computer screen. FIGS. 4A, 4B, and 4C are examples of many possible ways to present the information.

Statement of Utility

Our invention has specific and substantial utility for any User desiring to evaluate the degree of Responsiveness between one document (an inquiry, solicitation, plea, position, or and other written expression of need or want), and another document(s) (a bid, proposal, application, resume, or reply), and to do so over multiple iterations with guided improvements. There are many possible utilities for our invention, several embodiments are described as follows.

In one embodiment, this method and system is used to compare two documents, such as a business solicitation issued by a buyer, and the other a business proposal prepared by a seller. The generation of the TC Score with the various visual representations provides a consistent, objective, repeatable, and auditable measure of responsiveness, that being a primary objective of the seller as a means of winning the solicitation. In this instance, the seller, wishing to be selected as most responsive to the specifications of the solicitation, writes successive versions of the proposal, each with revisions to increase the TC Score to a satisfactory point in time or effort. The results of using our invention is to increase the likelihood of being selected as the winning proposal.

In another embodiment, this method and system is used to compare multiple documents to one document, such as multiple submitted proposals from various sellers to a buyer's solicitation (effectively the reverse of the first cited embodiment). In this way, the buyer can assess the degree of responsiveness as represented by the TC Score, providing a consistent, unbiased, repeatable, and auditable measure to support the selection of a single seller, or alternatively to select multiple sellers above a threshold. The results of using our invention is to select the most responsive seller as measured by the TC Score.

In another embodiment, this method and system is used to compare multiple documents to one document, such as multiple submitted resumes to a job posting. The degree of responsiveness as represented by the TC Score provides a consistent, unbiased, repeatable, and auditable measure of responsiveness, that being a primary objective of the hiring person or company as a means of selecting candidates, or alternatively, of revising the job description to better address the market. The results of using our invention is to reduce the amount of time and effort in screening the resumes by using the TC Score to identify the most responsive candidate, or failing a desired responsiveness, to revise the narrative of the job.

In another embodiment, this method and system is used to compare multiple documents to one document, such as multiple submitted academic written works to a single course outline or writing prompt. The degree of responsiveness as represented by the TC Score provides a consistent, unbiased, repeatable, and auditable measure of responsiveness, that being a primary objective of the academic instructor or institution as a means of grading scholars/applicants, or alternatively, of revising the course objectives to improve the learning materials. The results of using our invention is to reduce the amount of time and effort of grading scholarly works by using the TC Score to identify how responsive students/candidate, or failing a desired responsiveness, to revise the outline objectives of the course.

We can envision many other scenarios where an objective and repeatable process of correlating documents relative to each other will provide a benefit of time, effort, and mutual acceptability of the authoring parties, driven by their ingenuity and unique needs.

REFERENCES

Pearsons Correlation Coefficient, a well-known mathematical formula used in many data applications, as described on the website https://www.statology.org/pearson-correlation-coefficient/, in short, is a measure of the linear association between two variables X and Y, in our implementation, X and Y being two different documents.

$$r_{xy} = \frac{\sum_{i=1}^{n} (x_i - \bar{x})(y_i - \bar{y})}{\sqrt{\sum_{i=1}^{n} (x_i - \bar{x})^2} \sqrt{\sum_{i=1}^{n} (y_i - \bar{y})^2}}$$

Modified Cosine Similarity, a well-known mathematical formula used in many data applications, as described on the website https://en.wikipedia.org/wiki/Cosine_similarity, in short, is a measure of resemblance; i.e., how similar or alike things being compared are.

$$\cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

Individuals practiced in the science of mathematics and information display might implement variations of these visualizations of comparison, which would all be consistent with the Process Steps of our Invention.

The end result of Process Step 3 is visual information which gives the User with valuable information about the Responsiveness of one document for business purposes, in an objective and repeatable way.

This completes the series of Processes which comprise our Invention.

The invention claimed is:

1. A method of calculating a correlation of thematic content of two or more written documents which contain text in digital format, the method comprising:
   decomposing, for each of the two or more written documents, the text of the respective written document into a list of words in root word form to produce a plurality of lists of words in root word form, each list from the plurality of lists of words in root word form corresponding to a respective one of the two or more written documents;
   tabulating, for each of the plurality of lists of words in root word form, a frequency of occurrence of root word forms in the corresponding one of the two or more written documents to produce a plurality of frequency models of root word forms;
   recording each frequency model from the plurality of frequency models into an information arrangement to produce a plurality of information arrangements;
   correlating the plurality of information arrangements to produce a numerical thematic correlation score, the correlating comprising:
      performing a first correlation operation on the plurality of information arrangements to produce a first numerical result;
      performing a second correlation operation on the plurality of information arrangements to produce a second numerical result; and
      performing a mathematical operation on the first numerical result and the second numerical result to produce the numerical thematic correlation score; and
   providing a visual representation of the correlation score.

2. The method of claim 1,
   wherein one of the two or more written documents comprises a reference document; and
   wherein others of the two or more written documents comprise multiple versions of a non-reference document.

3. The method of claim 2,
   wherein the non-reference document comprises a reply to the reference document.

4. The method of claim 1,
   wherein the first correlation operation comprises a Pearson Correlation operation.

5. The method of claim 1,
   wherein the second correlation operation comprises a Modified Cosine Similarity operation.

6. The method of claim 1,
   wherein tabulating the frequency of occurrence of root word forms in the corresponding one of the two or more written documents to produce the plurality of frequency models of root word forms comprises:
      exempting from the tabulating words that are included in a known word list.

7. The method of claim 6, further comprising:
   updating the known word list to add new words to the known word list.

8. The method of claim 1, wherein tabulating the frequency of occurrence of root word forms in the corresponding one of the two or more written documents to produce the plurality of frequency models of root word forms comprises:

exempting from the tabulating words that are included in a registered word list.

9. The method of claim 8, wherein the registered word list comprises a list of words that are provided by user input.

10. The method of claim 1, wherein each information arrangement of the plurality of information arrangements comprises a table.

11. The method of claim 1, wherein decomposing the text of the respective written document into the list of words in root word form comprises removing numbers and special characters from the list of words.

12. The method of claim 1, wherein performing the mathematical operation on the first numerical result and the second numerical result to produce the numerical thematic correlation score comprises multiplying the first numerical result and the second numerical result to produce the numerical thematic correlation score.

* * * * *